March 20, 1962 S. L. BUCKAY 3,025,877
PRESSURE REGULATOR
Filed Dec. 17, 1958
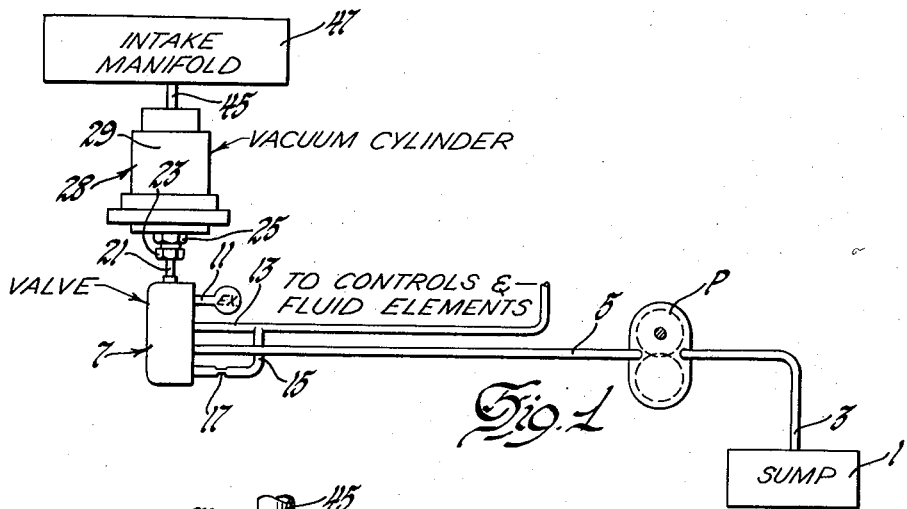
Fig. 1
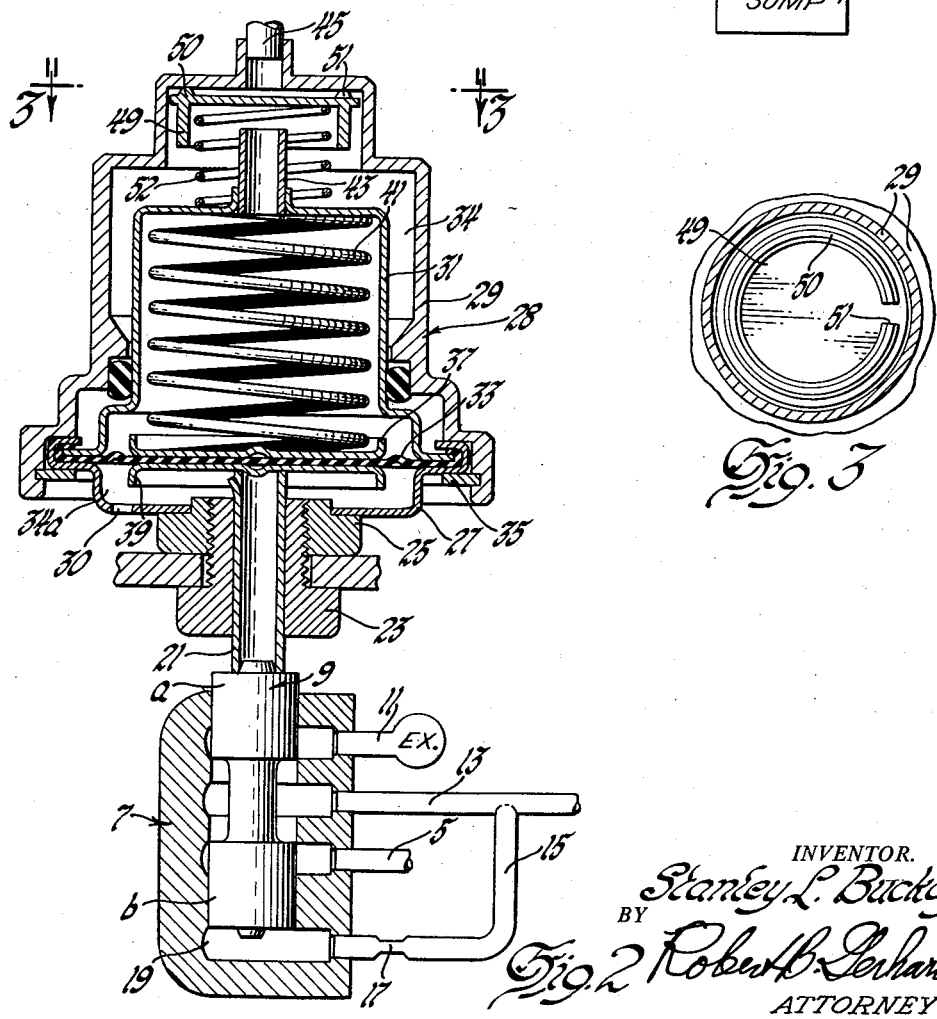
Fig. 2
Fig. 3
INVENTOR.
Stanley L. Buckay
BY
Robert B. Gerhardt
ATTORNEY

United States Patent Office 3,025,877
Patented Mar. 20, 1962

3,025,877
PRESSURE REGULATOR
Stanley L. Buckay, Birmingham, Mich., assignor to General Motors Corporation, Detroit, Mich., a corporation of Delaware
Filed Dec. 17, 1958, Ser. No. 781,155
3 Claims. (Cl. 137—620)

This invention relates to a fluid pressure control system and more particularly to an engine vacuum controlled pressure regulator system for a motor vehicle transmission.

It is common practice to utilize variations in engine intake manifold vacuum as a factor in controlling fluid pressures in transmission control systems because such variations provide a relatively good indication of the engine load. These variations therefore provide a fair measure of the torque or load transmitted by torque transmitting elements in change speed transmissions and by utilizing vacuum variations to effect the level of fluid pressure of fluid actuated friction devices in the transmission these devices can be actuated without either an excess of pressure or a deficiency of pressure, either of which contribute to friction slippage or to rough applications and releases of the friction devices.

Since the engine intake manifold pressure can change very rapidly with changes in the position of the engine throttle valve and because the torque transmitting requirements of the fluid actuated friction elements do not always change at the same rate as the manifold pressure, it is therefore desirable to provide a timing or delay means to ensure sufficient actuating pressure on the friction devices to prevent slippage therein until the torque being transmitted is reduced. This is especially important in a transmission having a dynamic hydraulic torque transmitting device such as a fluid coupling or hydraulic torque converter. These devices can store a considerable amount of kinetic energy which will be transmitted through the friction devices to the transmission load or driving wheels even though the engine torque and transmission input has declined due to closing the throttle valve.

It is therefore an object of this invention to provide a timing device to at times delay the effect of increasing engine vacuum upon a vacuum responsive pressure regulator valve.

It is a further object to provide a simple means integral with the vacuum control of a fluid pressure regulator valve for ensuring that such valve will cause sufficient fluid pressure to at all times be available in a transmission system.

These and other objects and advantages will be apparent from the following specification and drawings which illustrate a representative form of the invention and in which:

FIGURE 1 is a schematic view of a fluid pressure supply system such as might be used in a motor vehicle transmission;

FIGURE 2 is a detailed sectional view of a regulator valve incorporating the invention; and FIGURE 3 is a cross-sectional view taken on the line 3—3 of FIGURE 2.

Referring to FIGURE 1 which shows a transmission fluid pressure supply and regulation system similar to that utilized in the co-pending application S.N. 766,515, filed October 10, 1958, entitled Transmission Control System.

Oil from a sump 1 is drawn through a suction passage 3 by a pump P and is fed under pressure through a discharge passage 5 to the pressure regulator valve generally indicated at 7. Referring to FIGURE 2 it is seen that the regulator valve, which may be of any suitable form, includes a spool valve member 9 having lands a and b.

In or adjacent to the valve body are ports leading to an exhaust passage 11, a regulated output passage 13, a branch passage 15, and an orifice 17 leading to a chamber 19. Passage 13 is connected to other parts of the control system, not shown, such as those shown in the above-mentioned application S.N. 766,515.

The valve member 9 is urged downward as seen in the figures by a hollow push tube 21 which is slidably mounted in a drilled bolt 23 threaded into a retaining nut 25 that is secured in any suitable manner to a plate 27. The plate 27 acts as a cover for a vacuum cylinder generally indicated at 28 and including an outer housing member 29. The cover plate 27 cooperates with a cup shaped member 31 to form a vacuum chamber divided into an upper section 34 and a lower section 34a by a diaphragm 33 whose periphery is held between a flange on the cup 31 and the cover 27. The sheet metal vacuum cylinder formed by the cup 31 and cover 27 is held in place in the outer housing member 29 by a snap ring 35.

A pair of sheet metal discs 37 and 39 are located on opposite sides of the diaphragm 33. The upper disc 37 serves as a spring seat for receiving the force of a large coil spring 41 and the lower disc serves to transmit the diaphragm force to the push rod 21. Located in chamber 34 between the upper end of the inner cup 31 and the upper disc 37 is a large coil spring 41 which urges the diaphragm 33 downward. A tube 43 is secured in a formed aperture in the upper end of cup 31 to allow air to pass into and out of chamber 34.

The upper end of the outer housing 29 has a conduit 45 therein which leads to the engine intake manifold 47 as seen in FIGURE 1. A round check valve 49 is urged upward by a coil spring 52 that bears on the outside of cup 31 and surrounds the tube 43. The valve 49 has a circular ridge 50 that forms a valve seat that cooperates with the inner top end of the housing 29 to form a valve closure. The ridge 50 has a slot 51 formed therein that acts as an orifice to provide a fixed predetermined communication between the intake manifold 47 and the upper chamber 34 formed inside of cup 31.

The vacuum regulator valve operates as follows: When the engine is started a vacuum is formed within the intake manifold 47 and air is drawn from chamber 34 through tube 43, orifice 51 and passage 45 to create a vacuum acting on the top of diaphragm 33. This allows atmospheric pressure entering hole 30 to act on the under side of diaphragm 33 and counteract part of the force of spring 41. The spring 41 still exerts sufficient force to urge the valve 9 down and allow oil under pressure from pump P to pass between lands a and b and through the branch passage 15 and orifice 17 to act in chamber 19 on the valve 9 to urge it upward against tube 21 and the diaphragm 33. When the oil in chamber 19 and, hence, passage 13 has risen to a sufficient pressure level to move the valve 9 upward to the position shown in FIGURE 2 the pressure from pump P acting through passage 5 will be cut off by land b. If the pressure in passage 13 and hence, chamber 19 is above that required to move valve 9 to the equilibrium position shown, such pressure will move the valve 9 further upward allowing the land a to relieve excess pressure into exhaust passage 11.

As the engine intake manifold vacuum changes with changes in engine load, engine speed and throttle opening more or less of the force of spring 41 is available to oppose the force of oil pressure in chamber 19 and consequently the pressure maintained in passage 13 and the connected transmission elements will vary inversely with such vacuum changes. Upon a sudden increase in vacuum as where the throttle is suddenly closed the check valve 49 seats and will allow air from within the vacuum cup 31 to pass only through the orifice 51. The pressure maintained in passage 13 and the connected transmission elements by the valve 9 will therefore decrease at a relatively slow rate dependent on the size of the calibrated orifice 51. This will ensure sufficient oil pressure acting on friction elements of the transmission to enable them to carry the continued torque due to stored energy in the fluid coupling or torque converter. After a predetermined time during which the torque requirements of the friction elements declines, the pressure within chamber 34 will be equal to that in the intake manifold 47 and the oil pressure maintained by valve 9 in passage 13 will have dropped to its lower desired pressure.

Upon a sudden decrease in intake manifold vacuum as where the engine throttle is suddenly opened, air from the intake manifold 47 will force the valve 49 against spring 52 and will immediately act in chamber 34 on diaphragm 33 to aid the spring 41 and thereby allow the spring to urge valve 9 downward with a greater force and thereby permit a rapid rise of pressure in passage 13. The fluid pressure available for actuation and holding of friction elements will therefore be immediately available upon an increase in engine torque output.

It will be seen that I have provided a simple, compact and reliable means for providing the proper rate of rise and fall of oil pressure acting on friction elements in a transmission. Many modifications can be made within the scope of the invention, for example other types of check valves could be used and the vacuum orifice could be located in other places than that shown. These modifications and changes would be within the spirit of the invention which is to be limited only by the following claims.

What is claimed is:

1. A fluid pressure supply for a motor vehicle transmission including a source of fluid under pressure, a pressure regulator valve connected to said source, and adapted to supply a variable output pressure, pressure responsive means on said valve responsive to said variable output pressure for controlling movement of the valve, restriction means between said pressure responsive means and said output pressure for controlling the rate of movement of said valve, vacuum responsive means connected to said valve and adapted to vary the output pressure supplied by said valve, means connecting said vacuum responsive means to a variable vacuum source, check valve means interposed between said vacuum source and said vacuum responsive means and opening in the direction of said vacuum responsive means, means urging said check valve means to closed position, and a restricted by-pass around said check valve between said vacuum source and said vacuum responsive means, said check valve means constructed and arranged to provide a predetermined delay in response of said vacuum responsive means to an increase in vacuum from said source and allow a rapid response of said vacuum response means to a decrease in vacuum from said source.

2. A fluid pressure supply for a motor vehicle transmission including a source of fluid under pressure, a pressure regulator valve connected to said source, and adapted to supply a variable output pressure, pressure responsive means on said valve responsive to said variable output pressure for controlling movement of the valve, restriction means between said pressure responsive means and said output pressure for controlling the rate of movement of said valve, vacuum responsive means connected to said valve and adapted to vary the output pressure supplied by said valve, means connecting said vacuum responsive means to a variable vacuum source, check valve means interposed between said vacuum source and said vacuum responsive means and opening in the direction of said vacuum responsive means, means urging said check valve means to closed position, and a restricted passage in said check valve means between said vacuum source and said vacuum responsive means continuously connecting said source and said vacuum responsive means, said check valve means constructed and arranged to provide a predetermined delay in response of said vacuum responsive means to an increase in vacuum from said source and allow a rapid response of said vacuum response means to a decrease in vacuum from said source.

3. A pressure regulator valve assembly for supplying a variable regulated fluid pressure including a valve reciprocably mounted in a valve body and arranged to provide an increase in supplied pressure when urged in one direction and a decrease in supplied pressure when urged in the other direction, a fluid chamber adjacent to one end of said valve, a diaphragm having its center operatively connected to said valve and having its periphery fixed to said chamber to divide the same into two sections, means connecting a first of said sections to atmospheric pressure, biasing means in the other of said sections urging said diaphragm and connected valve in a direction to increase the pressure regulated by said valve, a variable source of vacuum, first restricted flow means connecting said vacuum source to said other section whereby said other section will be evacuated allowing atmospheric pressure in said first section to urge said diaphragm against said biasing means and in a direction to decrease the pressure regulated by said valve, second unrestricted flow means connecting said source to said other section, check valve means in said second unrestricted means, resilient means urging said check valve to closed position, said check valve means opening in a direction away from said vacuum source to allow unrestricted flow of air from said variable vacuum source through said unrestricted means to said other section and closing in the opposite direction to allow restricted flow of air from said other section through said unrestricted means to said vacuum source, and a second fluid chamber adjacent to the other end of said valve, means including a flow restriction connecting said fluid chamber to said supplied pressure for controlling the movement of said valve.

References Cited in the file of this patent

UNITED STATES PATENTS

| | | |
|---|---|---|
| 1,525,859 | Ferrari | Feb. 10, 1925 |
| 2,056,249 | Bystricky | Oct. 6, 1936 |
| 2,711,656 | Smirl | June 28, 1955 |